(12) United States Patent
Shiba et al.

(10) Patent No.: US 8,787,759 B2
(45) Date of Patent: Jul. 22, 2014

(54) DYNAMIC BANDWIDTH ALLOCATION APPARATUS AND METHOD AND OPTICAL LINE TERMINAL IN PON SYSTEM

(75) Inventors: Shingo Shiba, Osaka (JP); Toru Inoue, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 189 days.

(21) Appl. No.: 13/264,312

(22) PCT Filed: Nov. 26, 2009

(86) PCT No.: PCT/JP2009/069944
§ 371 (c)(1),
(2), (4) Date: Jan. 3, 2012

(87) PCT Pub. No.: WO2010/119587
PCT Pub. Date: Oct. 21, 2010

(65) Prior Publication Data
US 2012/0093500 A1    Apr. 19, 2012

(30) Foreign Application Priority Data
Apr. 16, 2009    (JP) .................. 2009-099576

(51) Int. Cl.
| | |
|---|---|
| H04J 14/00 | (2006.01) |
| H04J 3/22 | (2006.01) |
| H04L 12/56 | (2006.01) |
| H04J 14/02 | (2006.01) |
| H04Q 11/00 | (2006.01) |
| H04J 3/06 | (2006.01) |

(52) U.S. Cl.
CPC ......... *H04Q 11/0067* (2013.01); *H04J 14/0256* (2013.01); *H04J 14/026* (2013.01); *H04L 47/76* (2013.01); *H04J 14/0252* (2013.01); *H04J 14/0247* (2013.01); *H04Q 2011/0064* (2013.01); *H04J 14/0282* (2013.01); *H04J 14/0246* (2013.01); *H04J 3/0655* (2013.01)
USPC .............................. 398/67; 398/72; 370/468

(58) Field of Classification Search
USPC ........................................................... 398/25
See application file for complete search history.

(56) References Cited

U.S. PATENT DOCUMENTS

| | | | | |
|---|---|---|---|---|
| 6,404,777 | B1 * | 6/2002 | Hattori et al. ................. | 370/468 |
| 6,862,298 | B1 * | 3/2005 | Smith et al. .................... | 370/516 |

(Continued)

FOREIGN PATENT DOCUMENTS

| | | |
|---|---|---|
| JP | 11-275151 | 10/1999 |
| JP | 2004-153505 | 5/2004 |

(Continued)

*Primary Examiner* — Ken Vanderpuye
*Assistant Examiner* — Amritbir Sandhu
(74) *Attorney, Agent, or Firm* — McDermott Will & Emery LLP

(57) ABSTRACT

A dynamic bandwidth allocation apparatus 12 of the present invention is mounted on, for example, an optical line terminal 1 in a PON system that relays upstream frames F1 and F2 received from optical network units 2, to upper networks 6. The dynamic bandwidth allocation apparatus 12 calculates, based on the reception rates of the upstream frames F1 and F2 from the optical network units 2, the sending rates of relay destinations of the upstream frames F1 and F2, and changes in the amounts of data occurring upon relaying the upstream frames F1 and F2, allocated bandwidth upper limits (max_bw) at which even when the amounts of data increase, the upstream frames F1 and F2 can be relayed; and dynamically allocates amounts of upstream transmission for the respective optical network units 2 in the range of the calculated allocated bandwidth upper limits (max_bw).

8 Claims, 5 Drawing Sheets

(56) References Cited

U.S. PATENT DOCUMENTS

| | | | |
|---|---|---|---|
| 7,555,214 B2* | 6/2009 | Khermosh | 398/27 |
| 7,738,787 B2* | 6/2010 | Nakajima et al. | 398/33 |
| 7,889,990 B2* | 2/2011 | Kazawa et al. | 398/72 |
| 8,041,216 B2* | 10/2011 | de Lind van Wijngaarden | 398/71 |
| 8,175,610 B2* | 5/2012 | Pi et al. | 455/452.1 |
| 8,184,977 B2* | 5/2012 | Kazawa et al. | 398/72 |
| 8,638,697 B2* | 1/2014 | Dahlman et al. | 370/280 |
| 2004/0190528 A1 | 9/2004 | Dacosta et al. | |
| 2004/0192322 A1 | 9/2004 | Dacosta et al. | |
| 2005/0058135 A1* | 3/2005 | Sisto et al. | 370/395.2 |
| 2005/0148370 A1* | 7/2005 | Moldoveanu et al. | 455/562.1 |
| 2005/0163059 A1 | 7/2005 | Dacosta et al. | |
| 2007/0248109 A1* | 10/2007 | DeCarolis et al. | 370/412 |
| 2007/0254672 A1 | 11/2007 | Dacosta et al. | |
| 2009/0162065 A1* | 6/2009 | Mizutani et al. | 398/66 |
| 2010/0150168 A1* | 6/2010 | Chatterjee et al. | 370/465 |
| 2010/0271944 A1* | 10/2010 | Michaelis et al. | 370/230.1 |
| 2011/0170861 A1* | 7/2011 | Ding et al. | 398/25 |
| 2011/0318009 A1* | 12/2011 | Shiba | 398/67 |
| 2012/0213518 A1* | 8/2012 | Tamai et al. | 398/58 |
| 2012/0321315 A1* | 12/2012 | Timm et al. | 398/67 |

FOREIGN PATENT DOCUMENTS

| | | |
|---|---|---|
| JP | 3734732 B | 1/2006 |
| JP | 3768421 B | 4/2006 |
| WO | WO 2006/098825 A2 | 9/2006 |

\* cited by examiner

FIG. 3

(a) REPORT R

| Destination Address |
|---|
| Souce Address |
| Length/Type = 88-08 |
| Opecode = 00-03 |
| Timestamp |
| Number of queue sets |
| Report bimap |
| Queue #0 Report(16-ns UNITS) |
| Queue #1 Report |
| Queue #2 Report |
| Queue #3 Report |
| Queue #4 Report |
| Queue #5 Report |
| Queue #6 Report |
| Queue #7 Report |
| Pad/Reserved |
| FCS |

(b) GRANT G

| Destination Address |
|---|
| Souce Address |
| Length/Type = 88-08 |
| Opecode = 00-02 |
| Timestamp |
| Number of grants/Flags |
| Grant #1 Start time |
| Grant #1 Length(16-ns UNITS) |
| Grant #2 Start time |
| Grant #2 Length |
| Grant #3 Start time |
| Grant #3 Length |
| Grant #4 Start time |
| Grant #4 Length |
| Sync Time |
| Pad/Reserved |
| FCS |

DYNAMIC BANDWIDTH ALLOCATION APPARATUS AND METHOD AND OPTICAL LINE TERMINAL IN PON SYSTEM

RELATED APPLICATIONS

This application is the U.S. National Phase under 35 U.S.C. §371 of International Application No. PCT/JP2009/069944, filed on Nov. 26, 2009, which in turn claims the benefit of Japanese Application No. 2009-099576, filed on Apr. 16, 2009, the disclosures of which Applications are incorporated by reference herein.

TECHNICAL FIELD

The present invention relates to a dynamic bandwidth allocation apparatus and method that dynamically allocate upstream bandwidth for end nodes on a user side, and an optical line terminal in a PON (Passive Optical Network) system using the dynamic bandwidth allocation apparatus.

BACKGROUND ART

A PON system including an optical line terminal; an optical fiber network forming a configuration in which an optical fiber connected to the optical line terminal is split into a plurality of optical fibers by an optical coupler; and optical network units connected to the respective ends of the split optical fibers, is already implemented.

The PON optical line terminal dynamically allocates bandwidth in an upstream direction to the plurality of optical network units in a time-division manner, to prevent interference between upstream signals. An upstream signal communication band which is set for a communication channel is dynamically allocated to each optical network unit, according to the way in which the time division is performed.

Specifically, the optical line terminal receives in advance, from the respective optical network units, bandwidth requests (requests) for the amounts of data to be sent out in the upstream direction, determines upstream bandwidths for the respective optical network units to be allocated in response to the requests, and provides notification (grants) of transmission permitted bandwidths.

Since each grant includes a transmission start time and a transmission permitted length (a value corresponding to a period of time), each optical network unit can send out a predetermined amount of data in the upstream direction during a predetermined period of time specified in the grant (see, for example, Patent Literatures 1 and 2).

Meanwhile, regarding how upstream transmission bandwidth is allocated in response to the bandwidth requests from the plurality of optical network units, there are, for example, decentralized-type DBA (Dynamic Bandwidth Allocation) in which upon arriving of a request from one optical network unit, bandwidth is allocated to the optical network unit whenever necessary; and centralized-type DBA in which bandwidth requests from a plurality of (typically, all) optical network units are collected in a predetermined cycle and bandwidth is allocated in an integrated manner based on the bandwidth requests.

Of them, in the centralized-type DBA, service classes are classified into a low delay class where a maximum value of delay is set; and a normal delay class where such a maximum value is not set, based on one bandwidth allocation cycle (grant cycle) for an upstream direction. Then, by setting the bandwidth allocation cycle for the low delay class to be smaller than that for the normal delay class, compatibility between the effective uses of low delay and bandwidth is achieved (see Patent Literature 2).

CITATION LIST

Patent Literature

Patent Literature 1: Japanese Patent No. 3768421
Patent Literature 2: Japanese Patent No. 3734732

SUMMARY OF INVENTION

Technical Problem

The optical line terminal in the above-described PON system functions as a relay apparatus that relays an upstream frame received from an optical network unit, to an upper network through an application Server-Network Interface (SNI) or a Network-Network Interface (NNI).

However, in dynamic bandwidth allocation in the conventional PON system, the amount of allocation for upstream transmission for each optical network unit is determined based on a reception rate on the PON side (a rate for upstream transmission from the optical network unit) and the amount of data for which a bandwidth request is made by the optical network unit.

Therefore, for example, in the cases such as the following (1) to (3), upon relaying an upstream frame, a buffer overflow may occur in a queue for transmission to the upper side of the optical line terminal and accordingly a part of the upstream frame may be discarded and thus not transmitted to the upper side.

(1) When the amount of data of an upstream frame increases as a result of provision of a VLAN tag to the upstream frame upon relaying on the optical line terminal.

(2) When the amount of data of an upstream frame increases as a result of MAC in MAC encapsulation of the upstream frame upon relaying on the optical line terminal.

(3) When the sending rate on the SNI side is lower than the reception rate on the PON side.

In this case, when the upstream frame is a high-priority frame such as VoIP (Voice over Internet Protocol) or video, a harmful effect such as interruption of a call or video occurs, impairing QoS (Quality of Service) set by the optical network unit.

Meanwhile, for measures for resolving the above-described inconvenience, means of increasing the cumulative amount of data of upstream frames by adopting a large capacity buffer in the transmission queue on the upper side is considered. However, such means has drawbacks of causing an increase in size of an apparatus and an increase in cost.

In view of such conventional problems, an object of the present invention is to provide a dynamic bandwidth allocation apparatus, and the like, that avoid the discarding of upstream frames due to a buffer overflow, and can thereby perform bandwidth allocation allowing the upstream frames to be securely relayed to the upper side.

Solution to Problem

In accordance with one aspect of the present invention, there is provided a dynamic bandwidth allocation apparatus which is provided in a relay node performing two-way communication with a plurality of end nodes and which dynamically allocates, based on a bandwidth request from each end node, an amount of upstream transmission for the end node, the apparatus including: a managing unit that manages, for each end node, a reception rate of an upstream frame from the end node, a sending rate of a relay destination of the upstream frame, and a change in an amount of data occurring in the upstream frame upon relaying; a calculating unit that calculates, based on the reception rate, the sending rate, and the change in the amount of data, an allocated bandwidth upper limit at which even when the amount of data increases, the upstream frame can be relayed; and an allocation performing unit that dynamically allocates an amount of upstream transmission for the end node in a range of the calculated allocated bandwidth upper limit.

According to the dynamic bandwidth allocation apparatus of the present invention, the calculating unit calculates, based on the reception rate of an upstream frame from an end node, the sending rate of a relay destination of the upstream frame, and a change in the amount of data occurring in the upstream frame upon relaying, an allocated bandwidth upper limit at which even when the amount of data increases, the upstream frame can be relayed.

Then, the allocation performing unit dynamically allocates the amount of upstream transmission for each end node in the range of the thus calculated allocated bandwidth upper limit. Therefore, when the relay node relays upstream frames to the upper side, discarding of the upstream frames due to a buffer overflow does not occur.

Hence, according to the dynamic bandwidth allocation apparatus of the present invention, without the need to increase the buffer capacity on the upper side of the relay node, upstream frames can be securely relayed to the upper side, enabling to manufacture, at low cost, the relay node that ensures communication quality (QoS) for an upstream direction.

In the dynamic bandwidth allocation apparatus of the present invention, the number of relay destinations on the upper side of the relay node is not limited to one and may be plural.

In this case, the managing unit manages sending rates for a respective plurality of relay destinations and the calculating unit calculates, for each of the plurality of relay destinations, based on a corresponding one of the reception rates, a corresponding one of the sending rates for the respective plurality of relay destinations, and a corresponding one of the changes in the amounts of data, an allocated bandwidth upper limit at which even when a corresponding one of the amounts of data increases, a corresponding one of the upstream frames can be relayed.

Then, in this case, the allocation performing unit is allowed to dynamically allocate an amount of upstream transmission for each end node destined for the relay destination in a range of the calculated allocated bandwidth upper limit for the relay destination, whereby for all of the plurality of relay destinations, discarding of upstream frames due to a buffer overflow does not occur.

Hence, for all of the plurality of relay destinations, without the need to increase the buffer capacity on the upper side of the relay node, upstream frames can be securely relayed to the upper side.

In the dynamic bandwidth allocation apparatus of the present invention, it is preferable that the managing unit manage the changes in the amounts of data, assuming both an increase and a decrease in the amounts of data occurring in the upstream frames upon relaying.

In this case, an allocated bandwidth upper limit can be accurately calculated over the case of assuming only an increase in the amount of data of an upstream frame. Accordingly, an allocated bandwidth upper limit is prevented from being reduced more than necessary, enabling to accurately allocate the amount of upstream transmission for each end node.

Note that the cases in which the amount of data of an upstream frame increases upon relaying include, as described above, the case of providing a VLAN tag to the upstream frame and the case of performing MAC in MAC encapsulation of the upstream frame.

Note also that the case in which the amount of data of an upstream frame decreases upon relaying includes, for example, the case of performing FEC decoding on an upstream frame encoded by Forward Error Correction (FEC).

In accordance with another aspect of the present invention, there is provided a dynamic bandwidth allocation method performed by the above-described dynamic bandwidth allocation apparatus, which provides the same functions and effects as those provided by the dynamic bandwidth allocation apparatus.

Specifically, the dynamic bandwidth allocation method of the present invention is a dynamic bandwidth allocation method for dynamically allocating, based on bandwidth requests from a plurality of end nodes, an amount of upstream transmission for each end node, the method including: calculating, based on a reception rate of the upstream frame from each end node, a sending rate of a relay destination of the upstream frame, and a change in an amount of data occurring in the upstream frame upon relaying, an allocated bandwidth upper limit at which even when the amount of data increases, the upstream frame can be relayed; and dynamically allocating an amount of upstream transmission for the end node in a range of the calculated allocated bandwidth upper limit.

In accordance with still another aspect of the present invention, there is provided an optical line terminal having mounted thereon the above-described dynamic bandwidth allocation apparatus and functioning as a PON relay apparatus, which provides the same functions and effects as those provided by the dynamic bandwidth allocation apparatus.

Specifically, the optical line terminal of the present invention is an optical line terminal in a PON system, the terminal performing two-way optical communication with a plurality of optical network units through a passive light-splitting node, and relaying an upstream frame received from each optical network unit to an upper network, the terminal including: the above-described managing unit, the above-described calculating unit, and the above-described allocation performing unit.

Advantageous Effects of Invention

As described above, according to the present invention, when the relay node relays upstream frames to the upper side, discarding of the upstream frames due to a buffer overflow does not occur. Thus, without the need to increase the buffer capacity on the upper side of the relay node, the upstream frames can be securely relayed to the upper side.

Hence, a relay node capable of ensuring communication quality for an upstream direction (a PON optical line terminal, or the like) can be manufactured at low cost.

BRIEF DESCRIPTION OF DRAWINGS

FIG. 3(a) is a frame configuration diagram of a report frame and FIG. 3(b) is a frame configuration diagram of a gate frame.

DESCRIPTION OF EMBODIMENTS

[Overall Configuration of a PON System]

Figure 1:
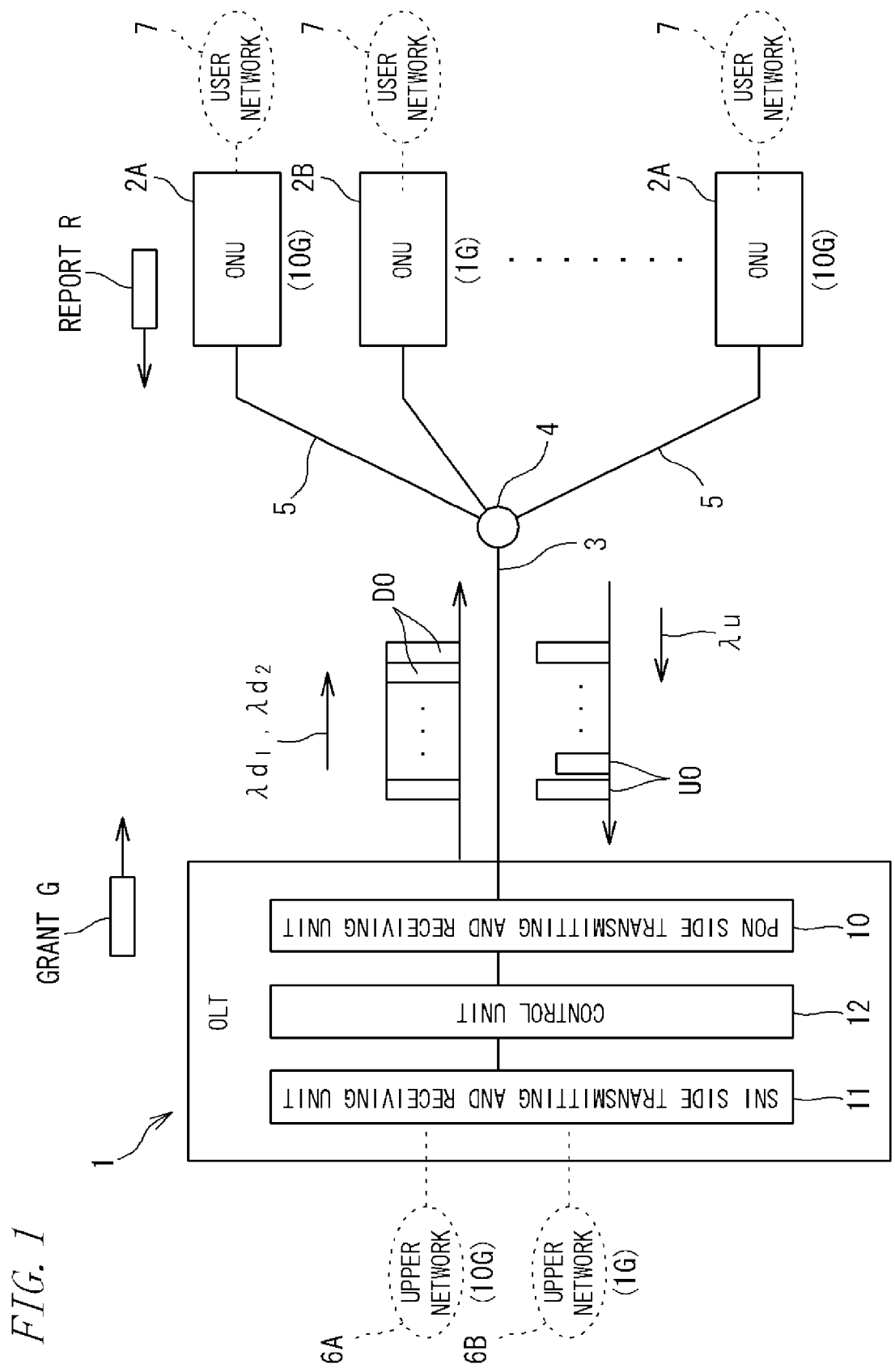
FIG. 1 is a schematic configuration diagram of a PON system according to an embodiment of the present invention.

FIG. 1 is a schematic configuration diagram of a PON system according to an embodiment of the present invention.

In FIG. 1, an Optical Line Terminal (OLT) 1 is a relay node between upper networks and the PON system, and is installed at a telecommunications carrier's central office, or the like, as a central station for a plurality of Optical Network Units (ONUs) 2A and 2B.

Each of the optical network units 2A and 2B is an end node on home side in the PON system and is installed in a PON system subscriber's home.

A single optical fiber 3 (main line) which is a transmission line on the PON side of the optical line terminal 1 is split into a plurality of optical fibers (branch lines) 5 by an optical coupler 4 serving as a passive light-splitting node. The optical network units 2A and 2B are connected to the respective ends of the split optical fibers 5.

In addition, an upper side interface of the optical line terminal 1 is a multi-port interface capable of establishing a connection with a plurality of upper networks 6A and 6B with different transmission rates. The optical network units 2A and 2B are connected to their respective user networks 7.

Note that, in the following, when the plurality of optical network units 2A and 2B are collectively represented, they are referred to as the "optical network units 2", and when the plurality of upper networks 6A and 6B are collectively represented, they are referred to as the "upper networks 6".

Note also that although FIG. 1 shows three optical network units 2, it is possible that, for example, 32 split optical fibers are obtained through the single optical coupler 4 to connect 32 optical network units 2. Furthermore, although in FIG. 1 only one optical coupler 4 is used, by longitudinally providing a plurality of optical couplers 4, more optical network units 2A and 2B can be connected to the optical line terminal 1.

In the example of FIG. 1, the transmission rate of the optical network units 2A is 10 Gbps and the transmission rate of the optical network unit 2B is 1 Gbps, and thus, the system has a configuration in which a GE-PON and a 10G-EPON coexist on an existing optical transmission line.

In this case, there is a need to multiplex and transmit a 1 G transmission signal and a 10 G transmission signal. As one of this multiplexing and transmission, for downstream multiplexing and transmission, a 10 G transmission signal and a 1 G transmission signal are multiplexed and transmitted at different wavelengths, and for upstream multiplexing and transmission, a 1 G transmission signal and a 10 G transmission signal are time division multiplexed at the same wavelength.

Specifically, for upstream direction communication between the optical line terminal 1 and the optical network units 2, a laser light of one type of wavelength λu is used, and for downstream direction communication, laser lights of two types of wavelengths, a wavelength λd1 for 10 G and a wavelength λd2 for 1 G, are used.

As such, the PON system of the present embodiment is a multi-rate PON system in which by performing Wavelength Division Multiplexing (WDM) on downstream optical signals DO transmitted from the optical line terminal 1 to the optical network units 2, the optical network units 2A and 2B having different transmission rates are accommodated in a mixed manner under control of the single optical line terminal 1.

Therefore, WDM filters are provided between the media (the optical fibers 3 and 5) of the PON system and a transmitter and a receiver of the optical line terminal 1 and each optical network unit 2. Only those wavelength components to be received are sent to a PON side receiver, and an optical signal outputted from a PON side transmitter is wavelength-multiplexed with received light through the WDM filter and the resulting signal is sent to the optical fibers 3 and 5.

In addition, in the PON system of the present embodiment, the transmission rate between the optical line terminal 1 and the upper network 6A is 10 Gbps, and the transmission rate between the optical line terminal 1 and the upper network 6B is 1 Gbps.

[Schematic Configuration of the Optical Line Terminal]

As shown in FIG. 1, the optical line terminal 1 includes a PON transmitting and receiving unit 10, an SNI transmitting and receiving unit 11, and a control unit 12 that performs communication control of those units.

Of them, the PON transmitting and receiving unit 10 includes therein an E/O conversion device and sends out, by this device, data transmission destined for the optical network units 2 to the optical fiber 3 as time division multiplexed downstream optical signals DO. The downstream optical signals DO are split by the optical coupler 3 and are then received by each optical network unit 2. Each optical network unit 2 performs a reception process on only data contained in a downstream optical signal DO destined for the optical network unit 2.

In addition, the PON transmitting and receiving unit 10 includes therein an O/E conversion device and receives, by this device, upstream optical signals UO sent out to the optical fibers 5 from the respective optical network units 2.

When the upstream optical signals UO from the respective optical network units 2 are optically multiplexed by the optical coupler 4 and are then transmitted to the single optical fiber 3, the control unit 12 of the optical line terminal 1 performs multiplexing control of transmission timing in a time-division manner so that the signals UO do not collide with each other.

Hence, as shown in FIG. 1, the upstream optical signals UO sent out from the respective optical network units 2 are arranged on a time axis, with a guard time inserted between the signals. Note that the time division multiplexing control performed by the optical line terminal 1 will be described later.

Note that although, in the optical line terminal 1 of the present embodiment, the SNI transmitting and receiving unit 11 is exemplified as an example of an upper side interface that communicates with the upper networks 6A and 6B, the upper side interface may be an NNI transmitting and receiving unit.

[Basic Functions of the PON System]

In the PON system of the present embodiment, media access control performed on the optical network units 2A and 2B by the control unit 12 of the optical line terminal 1 is performed according to a GE-PON standard (IEEE Std 802.3) and a 10 G-EPON standard (IEEE Std 802.3).

Various basic functions set out in the standards, which are performed by the control unit 12 of the optical line terminal 1, will be described below.

<Identification Function by an LLID>

In the PON system, there is an RS (Reconciliation Sublayer) that serves as an intermediary between a MAC (Media Access Control) layer and a physical layer. To identify Ethernet ("Ethernet" is a registered trademark, ditto hereinafter) frames between the optical line terminal 1 and the optical network units 2, an identifier is embedded in a part of a preamble defined by the RS.

Specifically, in the PON system, since the same downstream signal reaches all of the optical network units 2 in a broadcast format, each optical network unit 2 needs to make a choice by determining whether a frame received thereby is destined therefor.

Hence, in the PON system, this determination is performed using an identifier called an LLID (Logical Link ID). The LLID is contained in a preamble of an Ethernet frame.

Note that the value of an LLID is determined by the optical line terminal 1 upon registration of an optical network unit 2 (discovery will be described later), and the control unit 12 of the optical line terminal 1 manages LLIDs such that overlapping of LLIDs does not occur between the optical network units 2 which are under control thereof.

Here, in downstream direction communication (communication in a direction from the OLT to the ONUs), the control unit 12 of the optical line terminal 1 determines, for each transmission frame, which optical network unit 2 the transmission frame is transmitted to, and embeds an LLID for the optical network unit 2 in the transmission frame and then sends out the transmission frame to the optical network units 2.

Each optical network unit 2 checks the LLID of the received frame against its LLID notified in advance from the optical line terminal 1. If they match, then the optical network unit 2 determines that the received frame is destined therefor and thus takes the received frame. If they do not match, then the optical network unit 2 determines that the received frame is not destined therefor and thus discards the received frame.

On the other hand, in upstream direction communication (communication in a direction from the ONUs to the OLT), each optical network unit 2 embeds an LLID assigned thereto in a transmission frame and sends out the transmission frame to the optical line terminal 1. The optical line terminal 1 determines, by the value of the LLID of the received frame, which optical network unit 2 the frame is transmitted from.

As such, by performing identification by an LLID, communication which physically has a P2MP (Point to Multipoint) topology configuration but logically has a P2P (Point to Point) configuration can be performed. Thus, this function is sometimes called P2PE (Point to Point Emulation).

Note that, as an exception to P2PE, for downstream direction communication, a special LLID called a broadcast LLID may be defined. In this case, when a received frame has a broadcast LLID, the optical network units 2 unconditionally take the frame.

<Time Synchronization Function>

In the PON system, to perform time division multiplexing of upstream signals from the respective optical network units 2, time synchronization needs to be achieved between the optical line terminal 1 and the optical network units 2.

Hence, in a synchronous system set forth in the standards, the optical line terminal 1 maintains a synchronization state between the optical network units 2 and the optical line terminal 1, using time stamps embedded in gate frames which are issued to the optical network units 2 for transmission permission.

Specifically, the optical line terminal 1 transmits the current value of a master counter thereof to each optical network unit 2 as time stamp information, and the optical network unit 2 updates a master counter value thereof in accordance with the received time stamp value.

By this system, the optical network units 2 can operate in an independent synchronous system. Hence, a high-precision PLL which is required for a master-slave synchronization apparatus is not required, enabling to contribute to cost reduction.

<MPCP Function>

The PON system also adopts a multi-point MAC control sublayer including an MPCP (Multi-point Control Protocol) which is a control protocol between the optical line terminal 1 and the optical network units 2. The MPCP function includes the following functions 1) to 3). 1) A discovery function where the optical line terminal 1 recognizes a plurality of optical network units 2 connected to the PON, and performs RTT measurement and provision of LLIDs, which are required to perform communication between the optical network units 2 and the optical line terminal 1.

2) An upstream signal multiplexing control function where a time slot is assigned to each optical network unit 2 and upstream signals from the respective optical network units 2 are multiplexed on a time axis.

3) The above-described time synchronization function

<Discovery Function>

When an optical network unit 2 is connected to the PON, the optical line terminal 1 automatically discovers the optical network unit 2 and provides an LLID to the optical network unit 2 and then automatically establishes a communication link. This is the above-described discovery function.

Specifically, during a P2MP discovery period, the optical line terminal 1 measures an RTT (Round Trip Time: frame round trip time) between a concerned optical network unit 2 and the optical line terminal 1. At this time, the optical network unit 2 performs time synchronization with the optical line terminal 1.

Note that the time is represented by a counter which is incremented every 16 ns on each of the optical line terminal 1 and optical network units 2, and is synchronized in the PON system; however, the above-described RTT measurement and time synchronization are performed on a regular basis, and if a time lag occurs then the time lag is corrected whenever necessary.

<Upstream Direction Multiplexing Control Function>

In the PON system, since upstream optical signals UO from the respective optical network units 2 are merged by the optical coupler 4 into the single optical fiber 3, control needs to be performed such that the upstream optical signals UO do not collide with each other after the merging.

Hence, in the PON system, the optical line terminal 1 serves as a commander of the upstream signal control and notifies each optical network unit 2 of transmission permission, whereby the upstream signals from the respective optical network units 2 are temporally separated from each other to avoid collision.

Figure 2:
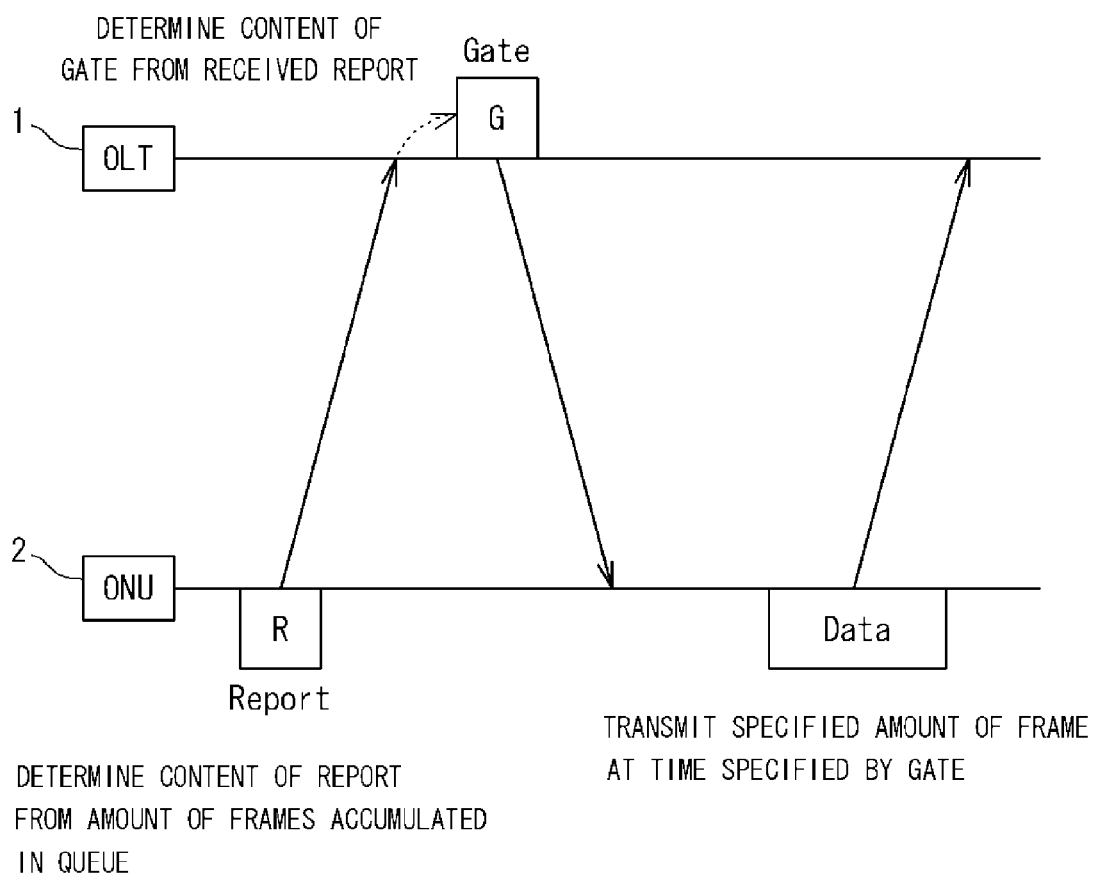
FIG. 2 is a sequence diagram showing an upstream signal multiplexing control function performed by an optical line terminal.

FIG. 2 is a sequence diagram showing the upstream signal multiplexing control function performed by the optical line terminal 1.

As shown in FIG. 2, when an optical network unit (ONU) 2 receives upstream data from its user network 7, the optical network unit 2 temporarily accumulates the data in its queue and specifies the amount of data accumulated in the queue in a report frame and then transmits the report frame to the optical line terminal 1.

The control unit 12 of the optical line terminal (OLT) 1 having received the report frame calculates an amount of upstream data transmission (a value corresponding to a period of time) to be allocated to the optical network unit 2 and a transmission start time (dynamic bandwidth allocation) from the amount of data specified in the report frame and the bandwidths used by other optical network units 2, and specifies the calculated values in a gate frame and then transmits the gate frame to the optical network unit 2.

Then, the optical network unit 2 having received the gate frame transmits upstream data at the specified transmission start time, according to an instruction of the gate frame. Note that upon transmitting the upstream data, the optical network unit 2 may transmit together therewith a report frame for notifying the amount of upstream data accumulated in the queue, for the next bandwidth allocation.

By repeating the above-described procedural steps, the control unit 12 of the optical line terminal 1 can appropriately allocate bandwidth for upstream transmission to each optical network unit 2 while knowing the upstream traffic conditions of each optical network unit 2.

FIG. 3(*a*) is a diagram showing an exemplary frame configuration of a report frame (which may hereinafter be referred to as a report) R transmitted from an optical network unit 2, and FIG. 3(*b*) is a diagram showing an exemplary frame configuration of a gate frame (which may hereinafter be referred to as a grant) G transmitted from the optical line terminal 1.

As shown in FIG. 3(*a*), in the report R sent out from the optical network unit 2, the amount of data for which a bandwidth request is made in the single report R is represented by a numerical value in 16-ns units (Queues #0 to #7 in FIG. 3(*a*)). On the other hand, as shown in FIG. 3(*b*), in the grant G transmitted from the optical line terminal 1, a transmission permitted length (a value corresponding to a period of time) for each optical network unit 2 is represented by a numerical value in 16-nanosecond units (Grants #1 to #4 in FIG. 3(*b*)).

<Dynamic Bandwidth Allocation Function>

The optical line terminal 1 in the PON system allocates bandwidth used to the optical network units 2 which are under control thereof, using the above-described report frames and gate frames, but an arithmetic algorithm for the allocated bandwidth is out of the above-described standards.

Note that dynamic bandwidth allocation performed by the control unit 12 of the optical line terminal 1 (specifically, an allocation performing unit 25 in a DBA processing unit 21 shown in FIG. 5) of the present embodiment will be described later.

<OAM Function>

The PON system is also one type of Ethernet and thus has an OAM (Operations, Administration and Maintenance) function complying with Ethernet standards. Here, OAM refers to maintenance and monitoring control of apparatuses and lines in a communication network.

For example, in the GE-PON standard (IEEE Std 802.3), an OAM sublayer is newly defined. The sublayer defines the frame structure of an OAM frame and a control function using the frame.

In addition, in the PON system, an OAM frame is used between the optical line terminal 1 and the optical network units 2. The principal functions using the OAM frame include fault notification, loopback testing, link monitoring, and the like.

In addition to those functions defined in the standards, an insufficient OAM function can, of course, be extended by a system developer when necessary.

[Centralized-type DBA]

As described above, dynamic bandwidth allocation methods performed by the optical line terminal 1 in response to bandwidth requests from the optical network units 2 include decentralized-type DBA and centralized-type DBA. In the present embodiment, the control unit 12 of the optical line terminal 1 is configured as a dynamic bandwidth allocation apparatus that performs the centralized-type DBA.

When the control unit 12 of the optical line terminal 1 performs the decentralized-type DBA, too, the present invention can, of course, be applied.

Figure 4:
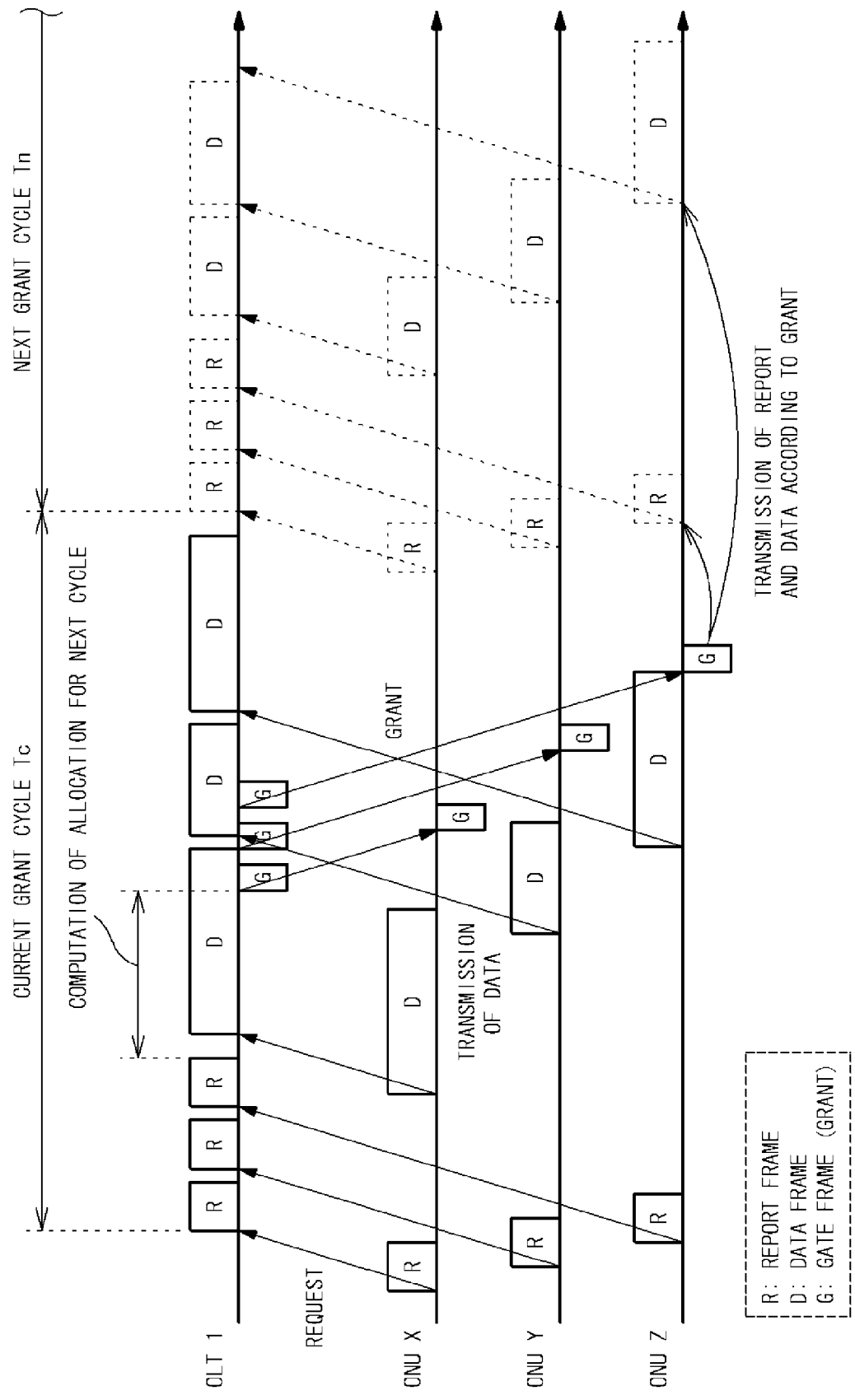
FIG. 4 is a sequence diagram showing centralized-type DBA.

FIG. 4 is a sequence diagram showing the centralized-type DBA.

In FIG. 4, time proceeds from the left to the right, and the optical network units 2 are indicated by reference signs X to Z, respectively.

In addition, a grant cycle which is a bandwidth control cycle of the optical line terminal 1 is indicated by reference sign T, the current grant cycle is indicated by reference sign Tc (the subscript c refers to "current"), and the next grant cycle is indicated by Tn (the subscript n refers to "next").

As shown in FIG. 4, in the centralized-type DBA, in the current grant cycle Tc, reports R from the optical network units X to Z are first received in a collective manner. Then, at the point in time when the reception of the reports R is done, computation of allocation for the next cycle starts.

The control unit 12 of the optical line terminal 1 then generates grants G specifying the computation results obtained in the current grant cycle Tc, and transmits the grants G to the respective optical network units X to Z to notify the optical network units X to Z of bandwidth allocation for the next reports R and data (upstream user data) D.

Specifically, in the centralized-type DBA, based on the reports R collected from the plurality of optical network units X to Z in the current grant cycle Tc, bandwidth allocation is performed in an integrated manner for upstream data D of the optical network units X to Z which is to be received by the optical line terminal 1 in the next grant cycle Tn, and transmission times of the next reports R and upstream data D are granted to the respective optical network units X to Z.

At this time, the control unit 12 of the optical line terminal 1 manages the cumulative amounts of allocation for the respective LLIDs of the optical network units X to Z, and reduces the amount of allocation for such an LLID that is determined to be allocated exceeding its allocated bandwidth upper limit (max_bw).

[Internal Configuration of the Optical Line Terminal]

Figure 5:
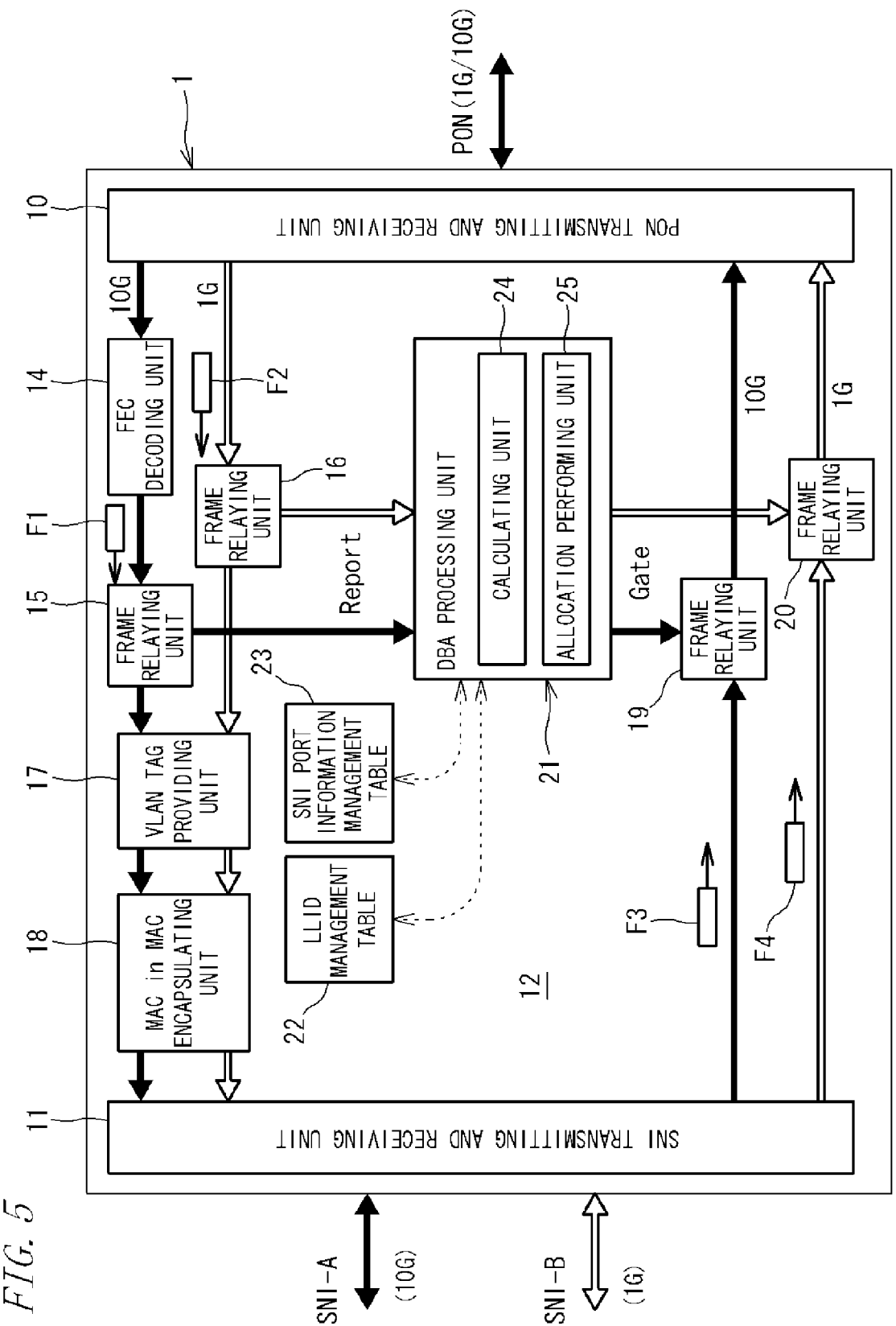
FIG. 5 is a functional block diagram showing an internal configuration of the optical line terminal.

FIG. 5 is a functional block diagram showing an internal configuration of the optical line terminal 1 which performs the above-described dynamic bandwidth allocation. Note that in FIG. 5 a bold solid arrow indicates a frame route for 10 Gbps and a bold open arrow indicates a frame route for 1 Gbps.

As shown in FIG. 5, the control unit 12 of the optical line terminal 1 includes, in an upstream direction from the PON side to the SNI side, a FEC decoding unit 14, a frame relaying unit 15 for 10 G, a frame relaying unit 16 for 1 G, a ULAN tag providing unit 17, and a MAC in MAC encapsulating unit 18.

In addition, the control unit 12 of the optical line terminal 1 includes, in a downstream direction from the SNI side to the PON side, a frame relaying unit 19 for 10 G and a frame relaying unit 20 for 1 G.

The control unit 12 of the optical line terminal 1 further includes a DBA processing unit 21 that performs an arithmetic algorithm for the aforementioned dynamic bandwidth allocation (FIG. 4), and an LLID management table (managing unit) 22 and an SNI port information management table (managing unit) 23 which have recorded therein reference information required for bandwidth allocation by the processing unit 21.

[Upstream Frame Relay Process]

A 10-Gbps upstream frame (hereinafter, referred to as a 10 G upstream frame) F1 received by the PON transmitting and receiving unit 10 is decoded by the FEC decoding unit 14 and the decoded 10G upstream frame F1 is inputted to the frame relaying unit 15 for 10 G.

If the 10 G upstream frame F1 is a report R, then the frame relaying unit 15 for 10 G sends it to the DBA processing unit 21. If the 10 G upstream frame F1 is a data frame, then the frame relaying unit 15 for 10 G sends it to the VLAN tag providing unit 17.

On the other hand, a 1-Gbps upstream frame (hereinafter, referred to as a 1 G upstream frame) F2 received by the PON transmitting and receiving unit 10 is inputted to the frame relaying unit 16 for 1 G.

If the 1 G upstream frame F2 is a report R, then the frame relaying unit 16 for 1 G sends it to the DBA processing unit 21. If the 1 G upstream frame F2 is a data frame, then the frame relaying unit 16 for 1 G sends it to the VLAN tag providing unit 17.

The VLAN tag providing unit 17 provides the inputted 10G or 1G upstream frame F1 or F2 with a tag for a VLAN.

A VLAN tag is a fixed-length tag which is added to a MAC frame, and is to identify a VLAN (Virtual LAN) group. By adding the tag, the frame is allowed to have identification information of a ULAN to which the frame belongs. The ULAN tag complies with a communication protocol standardized by the IEEE Std 802.1Q. By this, communications over a plurality of different VLANs are enabled with a single communication port, but since the tag is added to the frame, the frame length increases.

Meanwhile, the 10 G or 1 G upstream frame F1 or F2 having passed through the ULAN tag providing unit 17 is inputted to the subsequent MAC in MAC encapsulating unit 18.

MAC in MAC is a scheme in which a user MAC frame is encapsulated in a MAC frame for transfer in a carrier network and is then transferred. The encapsulating unit 18 performs encapsulating of this scheme on the 10 G or 1 G upstream frame F1 or F2. MAC in MAC complies with a protocol standardized by the IEEE Std 802.1ah.

According to the MAC in MAC, since in a carrier network an encapsulated MAC address for intra-network transfer is used, a MAC address of a user device does not need to be learned, held, or referred to, and thus, there is an advantage in that resource consumption in the carrier network can be suppressed. However, since a MAC header is added, the frame length increases.

The 10 G or 1 G upstream frame F1 or F2 outputted from the encapsulating unit 18 is inputted to the SNI transmitting and receiving unit 11. The SNI transmitting and receiving unit 11 sends out, based on the destination MAC addresses of the upstream frames F1 and F2, the frames F1 and F2 to the upper networks 6A and 6B.

Note that, basically, the 10 G upstream frame F1 is sent out to the 10-Gbps upper network 6A and the 1 G upstream frame F2 is sent out to the 1-Gbps upper network 6B, but there may be a reverse case depending on the destinations of the upstream frames F1 and F2.

[Downstream frame relay process]

A 10-Gbps downstream frame (hereinafter, referred to as a 10 G downstream frame) F3 received by the SNI transmitting and receiving unit 11 is inputted to the frame relaying unit 19 for 10 G.

The frame relaying unit 19 for 10 G transfers the 10 G downstream frame F3 to the PON transmitting and receiving unit 10. In addition, when the DBA processing unit 21 outputs a gate frame G for granting an optical network unit 2A (therefore, 10 Gbps), the frame relaying unit 19 for 10 G allows the gate frame G to be sent out to the PON transmitting and receiving unit 10.

A 1-Gbps downstream frame (hereinafter, referred to as a 1 G downstream frame) F4 received by the SNI transmitting and receiving unit 11 is inputted to the frame relaying unit 20 for 1 G.

The frame relaying unit 20 for 1 G transfers the 1 G downstream frame F4 to the PON transmitting and receiving unit 10. In addition, when the DBA processing unit 21 outputs a gate frame G for granting an optical network unit 2B (therefore, 1 Gbps), the frame relaying unit 20 for 1 G allows the gate frame G to be sent out to the PON transmitting and receiving unit 10.

[Problems Arising Upon Relaying Upstream Frames]

As described above, in the optical line terminal 1 of the present embodiment, depending on the upstream frames F1 and F2, provision of a ULAN tag or encapsulation of the MAC in MAC scheme is performed, and thus, the frame lengths (the amounts of data) of the upstream frames F1 and F2 subjected to those processes increase.

Hence, if dynamic bandwidth allocation by the DBA processing unit 21 is performed by adopting reception rates on the PON side (the rates for upstream transmission from the optical network units 2) and bandwidth requests from the respective optical network units 2 as they are, a buffer overflow may occur in a transmission queue on the SNI side and accordingly a part of the upstream frames F1 and F2 may be discarded.

In addition, since the optical line terminal 1 of the present embodiment has two different types of upper networks 6A and 6B with different transmission rates as relay destinations of the upstream frames F1 and F2, when the destination of the 10 G upstream frame F1 is the 1-Gbps upper network 6B, even if the DBA processing unit 21 allocates a bandwidth exceeding the sending rate on the upper side (1 Gbps), a portion of the frame corresponding to the bandwidth exceeding the sending rate (1 Gbps) is discarded.

Therefore, when the upstream frames F1 and F2 are high-priority frames such as VoIP or video, a harmful effect such as interruption of calls or video occurs, impairing QoS set by the optical network units 2.

Hence, the DBA processing unit 21 of the present embodiment has the function of reducing the maximum throughput for dynamic bandwidth allocation when the following conditions (1) to (3) which cause the above-described problems are satisfied:

(1) when the amounts of data of the upstream frames F1 and F2 increase as a result of provision of VLAN tags to the upstream frames F1 and F2 upon relaying on the optical line terminal 1;

(2) when the amounts of data of the upstream frames F1 and F2 increase as a result of MAC in MAC encapsulation of the upstream frames F1 and F2 upon relaying on the optical line terminal 1; and (3) when the sending rate on the SNI side is lower than the reception rate on the PON side.

Specifically, the DBA processing unit 21 includes a calculating unit 24 that calculates allocated bandwidth upper limits (max_bw) whose values are reduced so that the upstream frames F1 and F2 can be securely relayed, based on the values held in the above-described management tables 22 and 23; and an allocation performing unit 25 that performs dynamic bandwidth allocation in the range of the calculated allocated bandwidth upper limits (max_bw).

Note that LLIDs whose maximum throughput is to be reduced include all those LLIDs set for the same destination SNI port as that for LLIDs that match the above-described conditions (1) to (3).

[Recorded Contents of the Management Tables]

Of the above-described management tables 22 and 23, the LLID management table (hereinafter, referred to as a first table) 22 can hold the following values:

(a) an LLID provided to each optical network unit 2;
(b) a PON port number (upstream reception port);
(c) an SNI port number (upstream transmission port);
(d) max_bw_usr (an allocated bandwidth upper limit set by a user);
(e) max_bw_i (an allocated bandwidth upper limit for the LLID alone (=max_bw for when a single optical network unit is connected));
(f) max_bw (an actual allocated bandwidth upper limit (=min (max_bw_usr, max_bw_sni));
(g) whether a VLAN tag for upstream transmission is provided on the OLT;
(h) whether MAC in MAC encapsulation for upstream transmission is performed on the OLT; and
(i) whether FEC decoding for upstream transmission is performed on the OLT.

The above-described SNI port information management table (hereinafter, referred to as a second table) 23 can hold the following values:

(j) the port number of each SNI port;
(k) the transmission rate of the port;
(l) a list of LLIDs whose destinations are set to the port; and
(m) max_bw_sni (an allocated bandwidth upper limit for all those LLIDs included in the list).

[Process of Calculating an Allocated Bandwidth Upper Limit]

The calculating unit 24 in the DBA processing unit 21 monitors, by the above-described discovery function, addition or cancellation of an LLID which is a dynamic bandwidth allocation target. Every time the addition or cancellation takes place, the calculating unit 24 performs a process of calculating an allocated bandwidth upper limit (max_bw). This calculation process will be described below.

The calculating unit 24 calculates, for a given LLID, an upper limit a of the reception rate of a reception port on the PON side, at which relaying to the upper network 6A or 6B can be performed without causing packet loss when the maximum reception rate (transmission rate) of the reception port is "1", based on the following factors $\alpha a$ to $\alpha c$.

(a) Proportionality Factor $\alpha a$ Between the Transmission Rates

This factor $\alpha a$ is the ratio of the transmission rate of a relay destination port (SNI) to the transmission rate of the reception port (PON). Therefore, when the transmission rate of the SNI and the transmission rate of the PON are equal, $\alpha a=1$.

When the transmission rate of the SNI is 1 Gbps and the transmission rate of the PON is 10 Gbps, $\alpha a=0.1$, and in the reverse case $\alpha a=10$.

(b) The Increase Factor $\alpha b$ of the Amount of Data

This factor $\alpha b$ is a factor representing the degree of increase in the amount of data added to an upstream frame F1 or F2 by a relay process on the optical line terminal 1.

For example, when the upstream frame F1 or F2 is subjected to MAC in MAC, if calculation is performed with the worst value, then the minimum frame (64 bytes) is 86 bytes, and thus, the degree of increase is 1.3 times at the maximum, i.e., $\alpha b=1.3$. When a ULAN tag is provided to the upstream frame F1 or F2, if calculation is likewise performed with the worst value, $\alpha b=68/64$.

(c) The Decrease Factor $\alpha c$ of the Amount of Data

This factor $\alpha c$ is a factor representing the degree of decrease in the amount of data of the upstream frame F1 caused by a relay process on the optical line terminal 1.

In the present embodiment, since the 10 G upstream frame F1 is subjected to FEC decoding, there is significance in taking into account the factor of decrease $\alpha c$. For example, assuming FEC complying with the IEEE Std 802.3av specifications, $\alpha c=0.87$.

Then, the calculating unit 24 in the DBA processing unit 21 calculates the above-described upper limit a using the factors $\alpha a$ to $\alpha c$ by the following equation:

$$\alpha=\min\{1, \alpha a/(\alpha b \times \alpha c)\}$$

As described above, the allocation performing unit 25 in the DBA processing unit 21 performs dynamic bandwidth allocation on an LLID that is determined to be allocated exceeding its allocated bandwidth upper limit (max_bw), such that the amount of allocation decreases (including the case of the amount of allocation=0).

Hence, the calculating unit 24 in the DBA processing unit 21 monitors the cumulative amounts of allocation of LLIDs and calculates allocated bandwidth upper limits (max_bw) for all those LLIDs whose traffic is relayed to a given transmission port (SNI), based on the following equations.

Specifically, the calculating unit 24 calculates, for each LLID, the following max_bw_i (i is an argument of the LLID) using the above-described upper limit a and calculates, based on the max_bw_i, the following max_bw_sni and max_bw;

$$max\_bw\_i = \text{the transmission rate}(1\text{ G or }10\text{ G})\text{of a PON reception port} \times \alpha;$$

$$max\_bw\_sni = (\text{the lowest value of the max\_bw\_i of those LLIDs with the same destination SNI port});$$

and $$max\_bw = \min(max\_bw\_usr, max\_bw\_sni).$$

Here, in the above-described equations, max_bw_usr is the upper limit of an allocated bandwidth for each LLID set by a user, and this value is held in the first table 22.

The allocated bandwidth upper limit (max_bw) is used when the allocation performing unit 25 actually performs bandwidth allocation. Every time the calculating unit 24 calculates the allocated bandwidth upper limit (max_bw), the calculating unit 24 updates it and allows the first table 22 to hold the updated allocated bandwidth upper limit.

Then, the allocation performing unit 25 in the DBA processing unit 21 dynamically allocates the amounts of upstream transmission to the respective optical network units 2A and 2B in the range of the allocated bandwidth upper limits (max_bw) updated in the first table 22.

As such, according to the DBA processing unit 21 of the present embodiment, the calculating unit 24 calculates, based on the reception rates of upstream frames F1 and F2 from the optical network units 2 and the sending rates of relay destinations of the upstream frames F1 and F2, allocated bandwidth upper limits (max_bw) at which even if the amounts of data of the upstream frames F1 and F2 increase upon relaying, the upstream frames F1 and F2 can be relayed. The allocation performing unit 25 then dynamically allocates the amounts of upstream transmission for the respective optical network units in the range of the thus calculated allocated bandwidth upper limits (max_bw). Therefore, when the optical line terminal 1 relays the upstream frames F1 and F2 to the upper side, discarding of the upstream frames F1 and F2 due to a buffer overflow does not occur.

Hence, without the need to increase the buffer capacity on the upper side of the optical line terminal 1, the upstream frames F1 and F2 can be securely relayed to the upper side, enabling to manufacture, at low cost, the optical line terminal 1 that ensures communication quality (QoS) for an upstream direction.

In addition, according to the scheme of the present invention in which the addition or cancellation of an LLID which is a bandwidth allocation target triggers an update to an allocated bandwidth upper limit (max_bw), there is an advantage in that the buffer capacity can be reduced over, for example, a conventional scheme in which the amount of buffer is monitored and an update is performed when the amount of buffer exceeds a certain threshold value.

In addition, according to the DBA processing unit 21 of the present embodiment, a change in the amount of data occurring in the upstream frame F1 is managed assuming not only an increase in the amount of data occurring in the upstream frames F1 and F2 upon relaying (the above-described increase factor $\alpha b$), but also a decrease in the amount of data (the above-described decrease factor $\alpha c$). Therefore, an allocated bandwidth upper limit (max_bw) can be accurately calculated over the case of assuming only an increase in the amount of data of an upstream frame.

Accordingly, an allocated bandwidth upper limit (max_bw) can be prevented from being reduced more than necessary, enabling to accurately allocate the amount of upstream transmission for each optical network unit 2.

[Other Variants]

The above-described embodiment is an illustration and not a restriction of the present invention. The scope of the present invention is indicated by the appended claims rather than the above-described embodiment, and all changes which come in the range of equivalency of the claims and the configurations thereof are therefore intended to be embraced therein.

For example, in the above-described embodiment, the SNI transmitting and receiving unit 11 of the optical line terminal 1 supports two types of transmission rates (10 Gbps and 1 Gbps), but may perform transmission and reception using only one type of transmission rate. In addition, the PON transmitting and receiving unit 10 may also perform transmission and reception with the optical network units 2 using a single rate instead of multiple rates.

REFERENCE SIGNS LIST

1: OPTICAL LINE TERMINAL
2A: OPTICAL NETWORK UNIT (10 Gbps)
2B: OPTICAL NETWORK UNIT (1 Gbps)
6A: UPPER NETWORK (10 Gbps)
6B: UPPER NETWORK (1 Gbps)
10: PON TRANSMITTING AND RECEIVING UNIT
11: SNI TRANSMITTING AND RECEIVING UNIT
12: CONTROL UNIT (DYNAMIC BANDWIDTH ALLOCATION APPARATUS)
21: DBA PROCESSING UNIT
22: LLID MANAGEMENT TABLE (MANAGING UNIT)
23: SNI PORT INFORMATION MANAGEMENT TABLE (MANAGING UNIT)
24: CALCULATING UNIT
25: ALLOCATION PERFORMING UNIT

The invention claimed is:

1. A dynamic bandwidth allocation apparatus which is provided in a relay node performing two-way communication with a plurality of end nodes and which dynamically allocates, based on a bandwidth request from each end node, an amount of upstream transmission for the end node, the apparatus comprising:

a managing unit that manages, for each end node, a reception rate of an upstream frame from the end node, a sending rate of a relay destination of the upstream frame, and a factor representing, by a certain value, a degree of a change in an amount of data occurring in the upstream frame by a relay process varying a frame length of the upstream frame;

a calculating unit that calculates, based on the reception rate, the sending rate, and the factor, an allocated bandwidth upper limit at which even when the amount of data increases, the upstream frame can be relayed; and an allocation performing unit that dynamically allocates an amount of upstream transmission for the end node in a range of the calculated allocated bandwidth upper limit.

2. The dynamic bandwidth allocation apparatus according to claim 1, wherein the managing unit manages sending rates for a respective plurality of relay destinations, the calculating unit calculates, for each of the plurality of relay destinations, based on a corresponding one of the reception rates, a corresponding one of the sending rates for the respective plurality of relay destinations, and a corresponding one of the factors, an allocated bandwidth upper limit at which even when a corresponding one of the amounts of data increases, a corresponding one of the upstream frames can be relayed, and the allocation performing unit dynamically allocates an amount of upstream transmission for each end node destined for the relay destination in a range of the calculated allocated bandwidth upper limit for the relay destination.

3. The dynamic bandwidth allocation apparatus according to claim 1 or 2, wherein the managing unit manages the factors representing, by the certain value, the degrees of the changes in the amounts of data, assuming both an increase and a decrease in the amounts of data occurring in the upstream frames by the relay process.

4. The dynamic bandwidth allocation apparatus according to claim 1, wherein the factor includes an increase factor representing, by a certain value, a degree of an increase in the amount of data of the upstream frame caused by the relay process.

5. The dynamic bandwidth allocation apparatus according to claim 1, wherein the factor includes a proportionality factor, the proportionality factor being a ratio of a transmission rate of a relay destination port to a transmission rate of a reception port.

6. The dynamic bandwidth allocation apparatus according to claim 4 or 5, wherein the factor includes a decrease factor representing, by a certain value, a degree of a decrease in the amount of data of the upstream frame caused by the relay process.

7. A dynamic bandwidth allocation method for dynamically allocating, based on bandwidth requests from a plurality of end nodes, an amount of upstream transmission for each end node, the method comprising:

calculating, based on a reception rate of the upstream frame from each end node, a sending rate of a relay destination of the upstream frame, and a factor representing, by a certain value, a degree of a change in an amount of data occurring in the upstream frame upon relaying, an allocated bandwidth upper limit at which even when the amount of data increases, the upstream frame by a relay process varying a frame length of the upstream frame; and dynamically allocating an amount of upstream transmission for the end node in a range of the calculated allocated bandwidth upper limit.

8. An optical line terminal in a PON system, the terminal performing two-way optical communication with a plurality of optical network units through a passive light-splitting node, and relaying an upstream frame received from each optical network unit to an upper network, the terminal comprising:

a managing unit that manages, for each optical network unit, a reception rate of an upstream frame from the optical network unit, a sending rate of a relay destination of the upstream frame, and a factor representing, by a certain value, a degree of a change in an amount of data occurring in the upstream frame by a relay process varying a frame length of the upstream frame;

a calculating unit that calculates, based on the reception rate, the sending rate, and the factor, an allocated bandwidth upper limit at which even when the amount of data increases, the upstream frame can be relayed; and an allocation performing unit that dynamically allocates an amount of upstream transmission for the optical network unit in a range of the calculated allocated bandwidth upper limit.

* * * * *